United States Patent
Li

(10) Patent No.: US 11,585,787 B2
(45) Date of Patent: Feb. 21, 2023

(54) DETECTION DEVICE, DETECTION METHOD FOR DETECTION DEVICE, AND DETECTION SYSTEM

(71) Applicant: BOE TECHNOLOGY GROUP CO., LTD., Beijing (CN)

(72) Inventor: Yingyi Li, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 895 days.

(21) Appl. No.: 16/399,310

(22) Filed: Apr. 30, 2019

(65) Prior Publication Data

US 2020/0041454 A1 Feb. 6, 2020

(30) Foreign Application Priority Data

Aug. 1, 2018 (CN) .......................... 201810859882.5

(51) Int. Cl.
*G01N 29/02* (2006.01)
(52) U.S. Cl.
CPC ..... *G01N 29/022* (2013.01); *G01N 2291/022* (2013.01); *G01N 2291/0255* (2013.01)
(58) Field of Classification Search
CPC ........... G01N 29/022; G01N 2291/022; G01N 2291/0255
See application file for complete search history.

(56) References Cited

U.S. PATENT DOCUMENTS

| | | | |
|---|---|---|---|
| 8,669,688 B1 | 3/2014 | Branch | |
| 9,726,646 B1 | 8/2017 | Brocato et al. | |
| 2002/0045272 A1* | 4/2002 | McDevitt | G01N 21/253 436/518 |
| 2004/0133348 A1 | 7/2004 | Kalantar-Zadeh et al. | |
| 2005/0121999 A1 | 6/2005 | Edmonson et al. | |
| 2006/0254356 A1 | 11/2006 | Liu et al. | |
| 2012/0146457 A1 | 6/2012 | Goto et al. | |
| 2012/0149126 A1 | 6/2012 | Wilson et al. | |
| 2015/0362464 A1* | 12/2015 | Tanaka | G01N 29/222 73/649 |

(Continued)

FOREIGN PATENT DOCUMENTS

| | | |
|---|---|---|
| CN | 1528050 A | 9/2004 |
| CN | 1558227 A | 12/2004 |

(Continued)

OTHER PUBLICATIONS

Sesen, Muhsincan, et al. "Surface acoustic wave enabled pipette on a chip." Lab on a Chip 17.3 (Dec. 14, 2016): 438-447. (Year: 2016).*

(Continued)

*Primary Examiner* — Robert J Eom
(74) *Attorney, Agent, or Firm* — Brooks Kushman P.C.

(57) ABSTRACT

A detection device, a detecting method for the detection device, and a detecting system are provided. The detection device includes: a first interdigital transducer and a second interdigital transducer, wherein the first interdigital transducer is arranged opposite to the second interdigital transducer, and a surface wave of the first interdigital transducer is transmitted in a direction toward the second interdigital transducer; and a reaction layer arranged between the first interdigital transducer and the second interdigital transducer.

15 Claims, 4 Drawing Sheets

(56) References Cited

U.S. PATENT DOCUMENTS

2017/0199180 A1     7/2017   Kobayashi
2018/0348166 A1    12/2018   Kobayashi

FOREIGN PATENT DOCUMENTS

| CN | 101218504 A | 7/2008 |
| CN | 101458230 A | 6/2009 |
| CN | 102612405 A | 7/2012 |
| CN | 105934667 A | 9/2016 |
| CN | 107102058 A | 8/2017 |
| JP | 2014112109 A | 6/2014 |
| WO | 2011030519 A1 | 3/2011 |
| WO | 2017150584 A1 | 9/2017 |

OTHER PUBLICATIONS

First Office Action for Chinese Application No. 201810859882.5, dated Jun. 18, 2020, 10 Pages.

\* cited by examiner

DETECTION DEVICE, DETECTION METHOD FOR DETECTION DEVICE, AND DETECTION SYSTEM

CROSS-REFERENCE TO RELATED APPLICATION

This application claims priority to Chinese Patent Application No. 201810859882.5 filed on Aug. 1, 2018, which is incorporated herein by reference in its entirety.

TECHNICAL FIELD

The present disclosure relates to the field of detection technology, in particular to a detection device, a detection method for the detection device, and a detection system.

BACKGROUND

In biochemical and pathogen detection, for example, detection of proteins, sugars, deoxyribonucleic acid (DNA), viruses, bacteria, and cells, usually the to-be-detected substance is in contact with a detection recognition element of a detection device, so as to detect the to-be-detected substance. However, it is often the case that the detection recognition element is not in sufficient contact with the to-be-detected substance, such that it fails to detect the to-be-detected substance, and thus a detection result is incorrect.

SUMMARY

The disclosure mainly provides the following technical solutions.

In one aspect, the present disclosure provides in some embodiments a detection device, including: a first interdigital transducer and a second interdigital transducer, wherein the first interdigital transducer is arranged opposite to the second interdigital transducer, and a surface wave of the first interdigital transducer is transmitted in a direction toward the second interdigital transducer; and a reaction layer arranged between the first interdigital transducer and the second interdigital transducer.

Optionally, the detection device further includes: a liquid-pushing device, wherein the liquid-pushing device is arranged opposite to the reaction layer, a liquid-dropping region is arranged between the liquid-pushing device and the reaction layer, and the liquid-pushing device is configured to push a liquid in a pushing direction toward the reaction layer.

Optionally, the liquid-pushing device is a third interdigital transducer, and the pushing direction is a direction in which a surface wave of the third interdigital transducer is transmitted.

Optionally, there are a plurality of first interdigital transducers and a plurality of the second interdigital transducers, and the quantity of the first interdigital transducers is equal to the quantity of the second interdigital transducers, each of the first interdigital transducers and a respective one of the second interdigital transducers constitute a group of testing interdigital transducers, each of the first interdigital transducers is arranged opposite to the respective second interdigital transducer, a respective reaction layer is arranged between each of the first interdigital transducers and the respective second interdigital transducer.

Optionally, a plurality of groups of the testing interdigital transducers are arranged in at least one row, the groups of testing interdigital transducers arranged in the one row and one liquid-pushing device constitute a multi-unit joint detection structure. In the multi-unit joint detection structure, a direction in which the surface wave of the liquid-pushing device is transmitted is same as a direction in which the groups of testing interdigital transducers are arranged in the one row. In the multi-unit joint detection structure, the surface wave transmission direction of the liquid-pushing device is the same as the direction in which the testing interdigital transducers are arranged.

Optionally, in the multi-unit joint detection structure, a composition of the respective reaction layer arranged between any one of the first interdigital transducers and the respective second interdigital transducer is different from a composition of the respective reaction layer arranged between any other one of the first interdigital transducers and the respective second interdigital transducer.

Optionally, the first interdigital transducer and the second interdigital transducer are arranged on a substrate, and the reaction layer is arranged on the substrate.

Optionally, the first interdigital transducer and the second interdigital transducer are covered by an insulation layer.

Optionally, the reaction layer is arranged at a side of the insulation layer distal to the first interdigital transducer and the second interdigital transducer.

Optionally, two retaining walls are arranged respectively at two sides of the reaction layer, and the two retaining walls extend from respective two sides of the liquid-dropping region to respective two sides of the reaction layer to form a groove, and the two retaining walls covers respectively the first interdigital transducer and the second interdigital transducer.

Optionally, the first interdigital transducer and the second interdigital transducer are covered by an insulation layer, and the two retaining walls are arranged at a side of the insulation layer distal to the first interdigital transducer and the second interdigital transducer; or the first interdigital transducer and the second interdigital transducer are arranged on a substrate, the reaction layer is arranged on the substrate, the two retaining walls are arranged on the substrate, and the two retaining walls are in contact with the first interdigital transducer and the second interdigital transducer respectively Optionally, the retaining wall is made of an insulation material.

Optionally, the surface wave is a surface acoustic wave.

Optionally, the liquid-dropping region is configured to receive a to-be-tested liquid containing a to-be-detected substance, and the liquid-pushing device is further configured to be movable along the pushing direction, to push the to-be-tested liquid to arrive at the reaction layer, and enable the reaction layer to be in contact with the to-be-tested liquid.

Optionally, the detection device further includes: an output circuit configured to output a data signal, wherein the data signal indicates whether a first frequency of the surface wave detected by the first interdigital transducer is same as a second frequency of the surface wave detected by the second interdigital transducer.

In another aspect, the present disclosure provides in some embodiments a detection system including: a central processing unit and the above detection device. The detection device is connected to the central processing unit, and the central processing unit is configured to receive a data signal detected by the detection device.

Optionally, data is transmitted between the detection device and the central processing unit through visible light communication.

Optionally, a signal modulation circuit is arranged between the detection device and the central processing unit, and the signal modulation circuit is configured to filter and shape the data signal detected by the detection device.

In another aspect, the present disclosure provides in some embodiments a detection method applied to the above detection device, including: transmitting, by the first interdigital transducer, a surface wave in the direction toward the second interdigital transducer, to enable the second interdigital transducer to receive the surface wave; enabling the reaction layer to be in contact with a to-be-tested liquid containing a to-be-detected substance; detecting, by the first interdigital transducer, a first frequency of the surface wave transmitted by the first interdigital transducer, and detecting, by the second interdigital transducer, a second frequency of the surface wave received by the second interdigital transducer; determining whether the first frequency is different from the second frequency; and in the case where the first frequency is different from the second frequency, determining that the to-be-detected substance contains a substance that matches with the reaction layer.

Optionally, the detection device further includes a liquid-pushing device, the liquid-pushing device is arranged opposite to the reaction layer, a liquid-dropping region is arranged between the liquid-pushing device and the reaction layer, and the liquid-pushing device is configured to push a liquid in a pushing direction toward the reaction layer. The step of enabling the reaction layer to be in contact with the to-be-tested liquid containing the to-be-detected substance includes: dropping the to-be-tested liquid containing the to-be-detected substance into the liquid-dropping region; and pushing, by the liquid-pushing device, the to-be-tested liquid to arrive at the reaction layer.

DETAILED DESCRIPTION

The present disclosure will be described hereinafter in a clear and complete manner in conjunction with the drawings and embodiments. Obviously, the following embodiments merely relate to a part of, rather than all of, the embodiments of the present disclosure, and based on these embodiments, a person skilled in the art may, without any creative effort, obtain the other embodiments, which also fall within the scope of the present disclosure.

Figure 1:
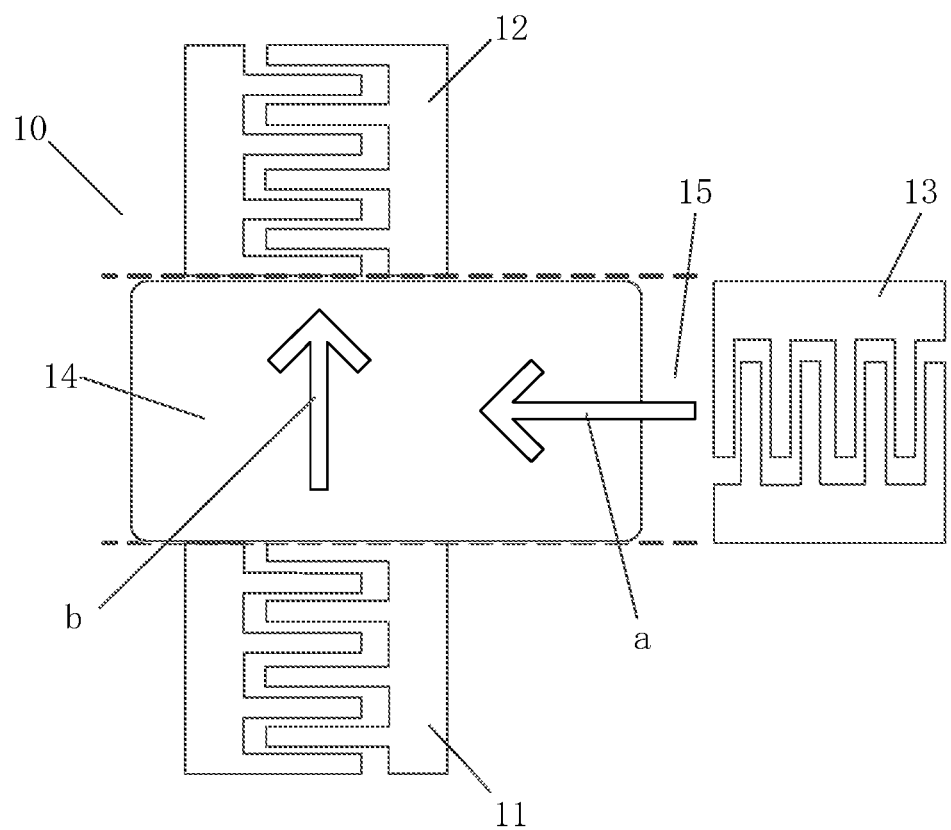
FIG. 1 is a structural schematic diagram of a detection device according to an embodiment of the present disclosure.

As shown in FIG. 1, the present disclosure provides in some embodiments a detection device 10 including a first interdigital transducer 11 and a second interdigital transducer 12, wherein the interdigital transducer also referred to as a finger insertion transducer, wherein it may form a metal pattern (interdigital electrodes) of a shape like crossing fingers of two hands on the surface of the piezoelectric substrate, so as to achieve a sound to electricity conversion. The interdigital transducer can function as either a transmitting transducer configured to generate and transmit surface acoustic waves or a receiving transducer configured to receive surface acoustic waves. The first interdigital transducer 11 is arranged opposite to the second interdigital transducer 12, the first interdigital transducer 11 functions as a transmitting transducer, and the second interdigital transducer 12 functions as a receiving transducer, and the first interdigital transducer 11 can generate and transmit the surface acoustic wave to the second interdigital transducer 12, the surface wave transmission direction b of the first interdigital transducer 11 is directed to the second interdigital transducer 12, and the second finger transducer 12 receives the surface acoustic wave.

A reaction layer 14 is arranged between the first interdigital transducer 11 and the second interdigital transducer 12, and the reaction layer 14 may be, for example, a thin layer of solution composed of predetermined components for detecting a substance matching with the reaction layer 14. For example, when the reaction layer 14 contains glutamic acid hydrochloride, the reaction layer 14 can detect a substance containing an $S^{2-}$ ion. In a specific implementation, the corresponding reaction layer 14 is selected according to the to-be-detected substance, and the to-be-detected substance is added into the liquid to form a to-be-tested liquid, the to-be-tested liquid is enabled to be in contact with the reaction layer 14. When the to-be-tested liquid contains the substance matching with the reaction layer 14, the substance interacts with the reaction layer 14, which interferes with the transmission of the surface wave from the first interdigital transducer 11 to the second interdigital transducer 12, so that a frequency transmitted by the first finger insertion transducer 11 is different from the frequency received by the second interdigital transducer 12, thereby determining that the to-be-detected substance contains a substance matching with the reaction layer 14.

Figure 2:
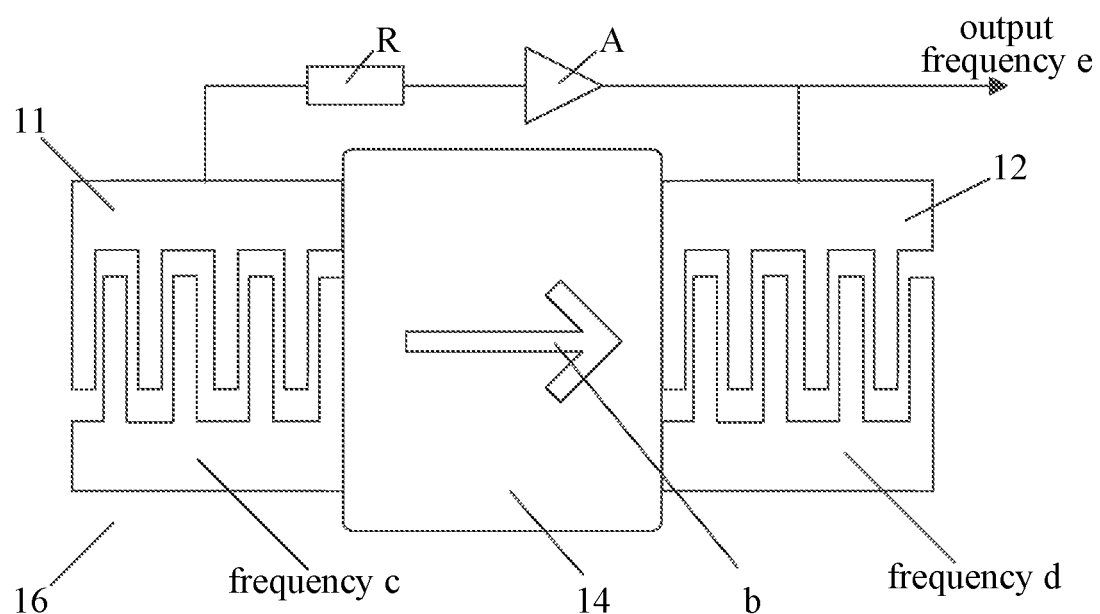
FIG. 2 is a schematic diagram of a surface wave sensor according to an embodiment of the present disclosure.

In the above, the first interdigital transducer 11, the second interdigital transducer 12, and the reaction layer 14 constitute the surface wave sensor 16 (see FIG. 2).

The detection device 10 further includes a liquid-pushing device 13 arranged opposite to the reaction layer 14, a direction in which the liquid-pushing device 13 is opposite to the reaction layer 14 is different from a direction in which the first interdigital transducer 11 is opposite to the second interdigital transducer 12, and the first interdigital transducer 11 and the second interdigital transducer 12 are not arranged on a path between the liquid-pushing device 13 and the reaction layer 14. The liquid-pushing direction a of the liquid-pushing device 13 is directed to the reaction layer 14, that is, when a liquid is arranged between the liquid-pushing device 13 and the reaction layer 14, the liquid-pushing device 13 may push the liquid to arrive at the reaction layer 14, and a pushing force of the liquid-pushing device 13 does not affect a surface wave transmission between the first interdigital transducer 11 and the second interdigital transducer 12. The liquid-pushing device 13 may be a device such as a hydraulic pushing device or a pneumatic pushing device, and may be a device capable of pushing a liquid in the related art, such as a micro fan or the like, or the liquid-pushing device 13 may be an interdigital transducer functioning as a transmitting transducer for transmitting a surface acoustic wave to push the liquid, which is not limited herein.

A liquid-dropping region 15 is provided between the liquid-pushing device 13 and the reaction layer 14, and the liquid-dropping region 15 is used to accommodate the to-be-tested liquid therein. As described above, the to-be-tested liquid is formed by adding a to-be-detected substance to a liquid. The to-be-tested liquid at the liquid-dropping region 15 can be pushed to arrive at the reaction layer 14 by the liquid-pushing device 13.

Embodiments of the present disclosure will be specifically described below by the operation principle of the detection device 10.

Before the detection device 10 performs the detection, the to-be-detected substance is added to the liquid to form the to-be-tested liquid, and then the to-be-tested liquid contains the to-be-detected substance, wherein the to-be-detected substance may be a cell, a pathogen or a chemical substance. Then, the to-be-tested liquid is dropped into the liquid-dropping region 15 between the liquid-pushing device 13 and the reaction layer 14, and the to-be-tested liquid is pushed by the liquid-pushing device 13 to reach the reaction layer 14. The liquid-pushing direction a of the liquid-pushing device 13 is directed to the reaction layer 14, and the detection is to be performed by the surface wave sensor 16 consisting of the first interdigital transducer 11, the second interdigital transducer 12, and the reaction layer 14 arranged therebetween. Referring to FIG. 2, the substance in the to-be-tested liquid is detected according to an output frequency of the surface wave sensor 16. Specifically, the first interdigital transducer 11 generates and transmits the surface acoustic wave to the second interdigital transducer 12, and the surface wave transmission direction b of the first interdigital transducer 11 is directed to the second interdigital transducer 12, and the first interdigital transducer 11 emits a frequency c. The frequency signal emitted by the first interdigital transducer 11 is transmitted to the receiving end of the second interdigital transducer 12 through the amplifier A, and a gain of the amplifier A can compensate for the loss to ensure a vibration state of the surface wave sensor 16. The first interdigital transducer 12 is connected to the amplifier A via the resistor R according to the technical means in the related art, and the second interdigital transducer 12 receives the frequency d. When the to-be-detected substance contained in the to-be-tested liquid matches with the reaction layer 14, the to-be-detected substance interacts with the reaction layer 14 (for example, absorption or a chemical reaction), thereby affecting a transmission speed of the surface wave, such that the frequency c emitted by the first interdigital transducer 11 is different from the frequency d received by the second interdigital transducer 12. That is, an output frequency e of the surface wave sensor 16 changes, indicating that the to-be-detected substance is a substance matching with the reaction layer, thereby determining parameters and indices of the to-be-detected substance; in contrary, when the frequency c emitted by the first interdigital transducer 11 is same as the frequency d received by the second interdigital transducer 12, that is, the output frequency e of the surface wave sensor 16 remains unchanged, indicating that the to-be-detected substance is not a substance matching with the reaction layer 14, and there is no substance that matches with the reaction layer 14 in the to-be-tested liquid. Wherein, the reaction layer 14 is provided in advance, and the composition of the reaction layer 14 is known before the detection, and the composition of the substance matching with the reaction layer 14 is known from the composition of the reaction layer 14.

According to a detection device provided by an embodiment of the present disclosure, the to-be-tested liquid is pushed to reach the reaction layer between the first interdigital transducer and the second interdigital transducer by the liquid-pushing device, and the substance in the to-be-tested liquid is detected according to an output frequency of the surface wave sensor composed of the first interdigital transducer and the second interdigital transducer and the reaction layer arranged therebetween, wherein the liquid-pushing device can continuously push the to-be-tested liquid to flow and diffuse, so that the to-be-tested liquid is in full contact with the reaction layer, and thus a detection process is performed sufficiently on the to-be-detected substance in the to-be-tested liquid to improve the accuracy of the detection. In addition, the surface wave sensor is used for biochemical detection, which has the characteristics of high precision and high sensitivity. Wherein, data may be outputted in frequency form, which can realize real-time and efficient data output.

Figure 3:
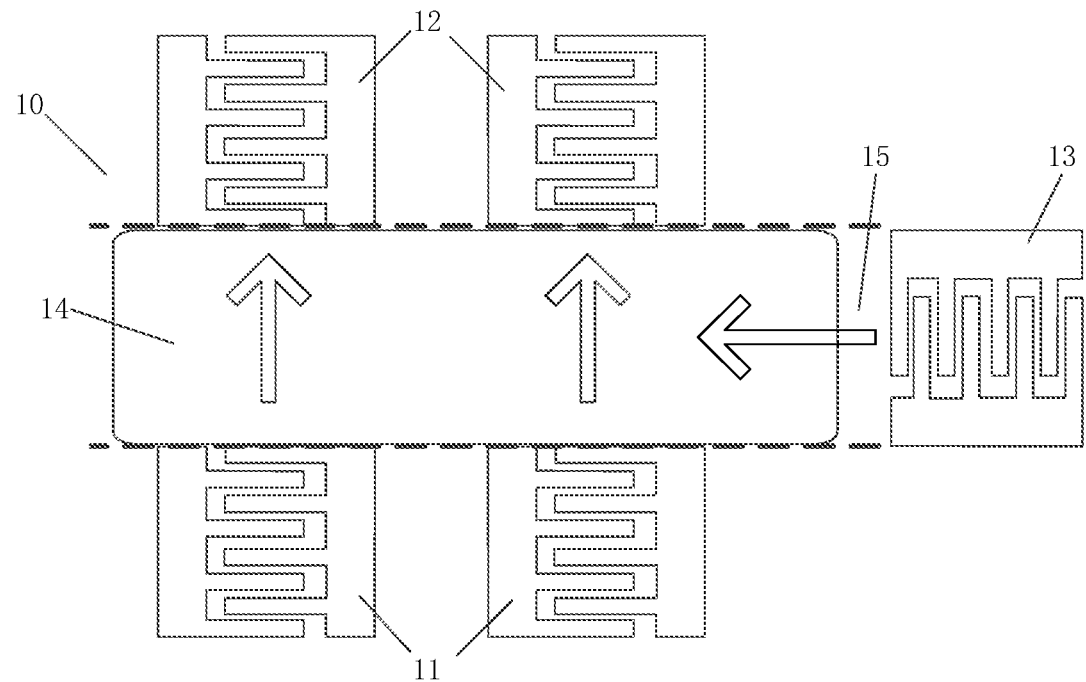
FIG. 3 is a structural schematic diagram of another detection device according to an embodiment of the present disclosure.

Specifically, as shown in FIGS. 1 and 3, the liquid-pushing device 13 is a third interdigital transducer, and the liquid-pushing direction a of the liquid-pushing device 13 is a surface wave transmission direction of the third interdigital transducer. Wherein, the third interdigital transducer functions as a transmitting transducer and can generate and transmit the surface acoustic wave. When the surface acoustic wave transmitted by the third interdigital transducer is in contact with the to-be-tested liquid, the surface acoustic wave is attenuated and enters the liquid. The surface acoustic wave mainly exists in the liquid in the form of a longitudinal wave. The longitudinal wave refers to a wave whose vibration direction is consistent or parallel with a transmission direction. There are two cases as below: when the amplitude of the surface acoustic wave transmitted by the third interdigital transducer is sufficiently large, the force caused by a transmission of the surface acoustic wave is sufficiently high to push the to-be-tested liquid along the surface wave transmission direction (i.e., the liquid-pushing direction a) of the third interdigital transducer, so that the to-be-tested liquid reaches the reaction layer 14; when the amplitude of the surface acoustic wave transmitted by the third interdigital transducer is low, for example, the viscosity of the to-be-tested liquid is large, the longitudinal wave in the liquid forms a sound field flow, and the sound field flow is related to factors such as power, frequency and liquid size of the surface acoustic wave, and the sound field flow generates a sound pressure difference to cause the liquid to deform. When the sound pressure difference is greater than the critical force that overcomes interactions such as a solid-liquid frictional force and a surface tension, the liquid moves along the surface acoustic wave transmission direction, so that the liquid is pushed towards the reaction layer 14.

In the detection device provided by an embodiment of the present disclosure, each of the first interdigital transducer, the second insertion transducer, and the third insertion transducer is of a structure of metal electrodes of a finger-crossing-like shape formed on the surface of the piezoelectric substrate, which can be made to be a chip-scale size, thus can be applied to the chip-scale size detection environment, which overcomes the problem that the detection device has a large size and the detection application environment is limited in the related art.

Specifically, as shown in FIG. 3, the quantity of the first interdigital transducer 11 and the quantity of the second interdigital transducer 12 are both multiple, and the quantity of the first interdigital transducer 11 and the quantity of the second interdigital transducer 12 are the same, each of the first interdigital transducers 11 and its opposite second interdigital transducer 12 form a group of testing interdigital transducers, and a respective reaction layer 14 is arranged between each first interdigital transducer 11 and its opposite second interdigital transducers 12 opposite to the first interdigital transducer 11; each of the first interdigital transducers 11 and its opposite second interdigital transducer 12 and the reaction layer 14 arranged therebetween constitute a surface wave sensor.

The plurality of first interdigital transducers 11, the plurality of second interdigital transducers 12, and the plurality of reaction layers 14 constitute a plurality of surface wave sensors, which can simultaneously detect a plurality of substances. Specifically, a plurality of to-be-detected substances are added to the liquid to form a to-be-tested liquid, and the liquid is pushed by the liquid-pushing device 13 to cause the to-be-tested liquid to reach the plurality of reaction layers 14, so as to detect a plurality of substances in the to-be-tested liquid; or the plurality of to-be-detected substances may be added respectively into a plurality of liquids to form a plurality of to-be-detected liquids, and the plurality of surface wave sensors detect respectively the plurality of to-be-detected liquids. Wherein, a plurality of the liquid-pushing devices may be provided, for example, each liquid-pushing device corresponds to a respective one surface wave sensor; or one liquid-pushing device 13 may be provided, in which case a plurality of surface wave sensors are arranged in a row, so that the plurality of reaction layers 14 are arranged along a straight line extending in the direction in which the plurality of surface wave sensors are arranged, and the surface wave transmission direction of the liquid-pushing device 13 is same as the arrangement direction of the plurality of surface wave sensors, and this design is only suitable for adding a plurality of to-be-detected substances into one to-be-tested liquid; or, a plurality of surface wave sensors are arranged in a plurality of rows, and each row is provided with a liquid-pushing device 13.

Specifically, as mentioned above, one liquid-pushing device 13 may correspond to a row of surface wave sensors, that is, a plurality of groups of the testing interdigital transducers are arranged in at least one row, the groups of testing interdigital transducers arranged in the one row and one liquid-pushing device 13 constitute a multi-unit joint detection structure; in the multi-unit joint detection structure, the surface wave transmission direction of the liquid-pushing device 13 is same as the direction in which the testing interdigital transducers are arranged. This design realizes multi-unit joint biochemical detection, that is, the liquid-pushing device 13 in the same row can push the to-be-tested liquid to arrive at the plurality of reaction layers 14 in the row, and substances in the to-be-tested liquid may be simultaneously detected. The plurality of reaction layers 14 may be different from each other to realize detection of different substances, or the same reaction layers may exist in among the plurality of reaction layers 14 to further ensure the correctness of a detection result and improve the detection accuracy. When there is a substance matching with the reaction layer 14 in the to-be-tested liquid, the substance interacts with the reaction layer 14, thereby affecting a speed of the surface wave transmitted from the first interdigital transducer 11 to the second interdigital transducer 12. Therefore, it is possible to determine that there is a substance matching with the reaction layer 14 in the to-be-tested liquid based on the difference between a transmission frequency of the first interdigital transducer 11 and a reception frequency of the second interdigital transducer 12.

Specifically, in the multi-unit joint detection structure, the reaction layer 14 between each of the first interdigital transducers 11 and the second interdigital transducers 12 opposed thereto is different. Wherein, different reaction layers 14 are required for different detection indexes, so that the reaction layers 14 which are different from each other can be adopted to detect a plurality of substances in one to-be-tested liquid. Specifically, a plurality of substances are added to the liquid to form one to-be-tested liquid, and the to-be-tested liquid is dropped into the liquid-dropping region 15 between the liquid-pushing device 13 and the reaction layer 14, and the to-be-tested liquid is pushed by the liquid-pushing device 13. The to-be-tested liquid reaches the different reaction layers 14, thereby detecting whether the plurality of substances in the to-be-tested liquid are substances matching respectively with the different reaction layers 14.

Figure 4:
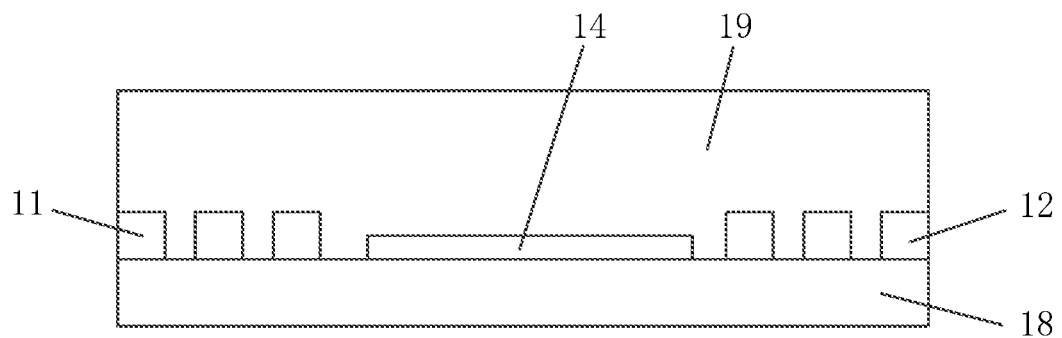
FIG. 4 is a schematic cross-sectional diagram of a detection device according to an embodiment of the present disclosure.

Specifically, as shown in FIG. 4, the first interdigital transducer 11 and the second interdigital transducer 12 are arranged on the substrate 18, and the reaction layer 14 is arranged on the substrate 18. For the to-be-tested liquid 19 being not conductive, it may be directly in contact with the first interdigital transducer 11 and the second interdigital transducer 12, and the reaction layer 14 is arranged on the substrate 18 and located between the first interdigital transducer 11 and the second interdigital transducer 12, and the reaction layer 14 is in contact with the to-be-tested liquid 19.

Figure 5:
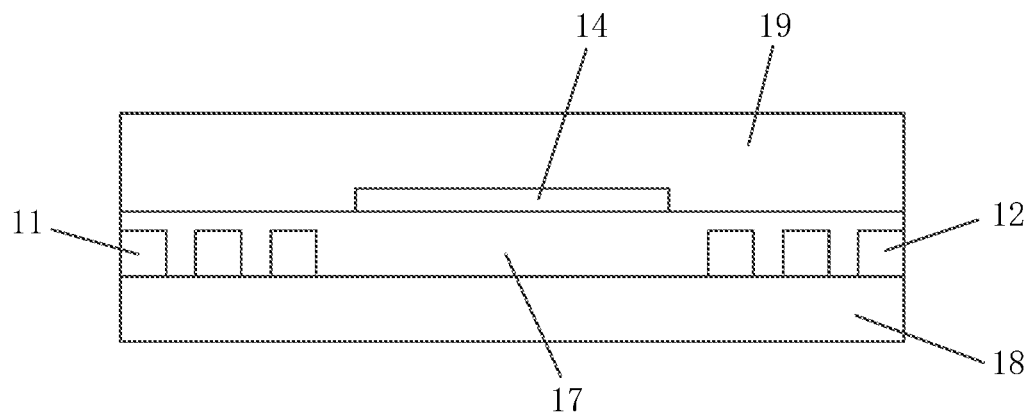
FIG. 5 is a schematic cross-sectional diagram of another detection device according to an embodiment of the present disclosure.

Specifically, as shown in FIG. 5, the first interdigital transducer 11 and the second interdigital transducer 12 are covered by an insulation layer 17. For the to-be-tested liquid 19 being conductive, the insulation layer 17 is required to insulate the first interdigital transducer 11 and the second interdigital transducer 12, and the to-be-tested liquid 19 is isolated from the first interdigital transducer 11 and the second interdigital transducer 12 to ensure that the detection process may be performed properly. It should be noted that when the liquid-pushing device 13 is the third interdigital transducer, in the case that the third interdigital transducer is not isolated from the to-be-tested liquid, the third interdigital transducer can alternatively be covered by an insulation layer to ensure that the third interdigital transducer may operate properly.

Specifically, the reaction layer 14 is arranged at a side of the insulation layer 17 distal to the first interdigital transducer 11 and the second interdigital transducer 12. Wherein, the insulation layer 17 covers the substrate 18, the reaction layer 14 is located on the insulation layer 17, and an orthographic projection of the reaction layer 14 onto the substrate 18 is located between the first interdigital transducer 11 and the second interdigital transducer 12, and the reaction layer 14 is in contact with the to-be-tested liquid 19.

Figure 6:
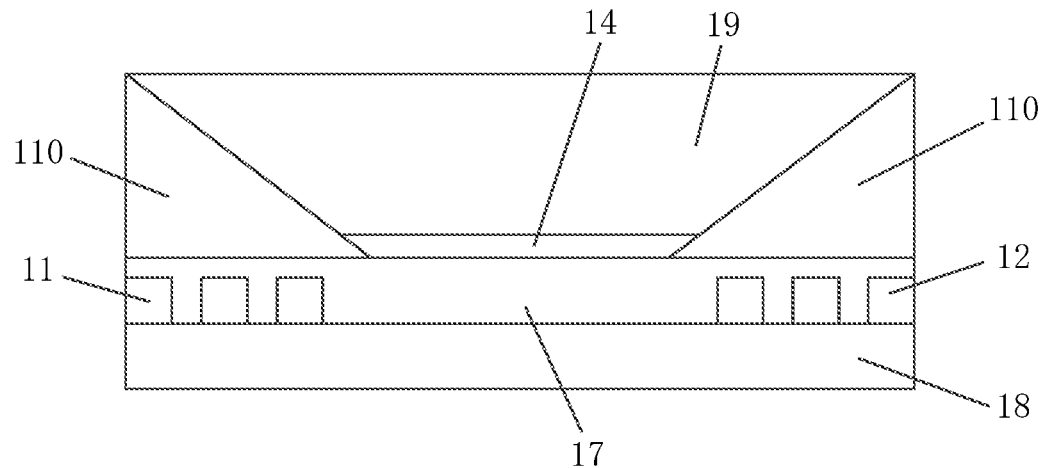
FIG. 6 is a schematic cross-sectional diagram of another detection device according to an embodiment of the present disclosure.
Figure 7:
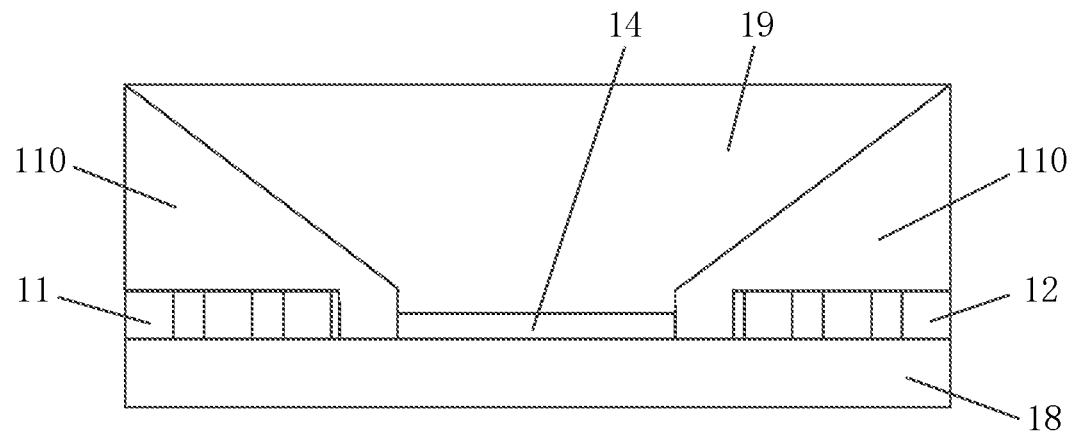
FIG. 7 is a schematic cross-sectional diagram of another detection device according to an embodiment of the present disclosure.

Specifically, in conjunction with FIG. 3 and FIG. 6 and FIG. 7, along the pushing direction of the liquid-pushing device 13, both sides of the reaction layer 14 are respectively provided with retaining walls 110, and the retaining walls 110 on both sides are respectively extend to both sides of the reaction layer 14 from both sides of the liquid-dropping region 15 to form a groove, and the retaining walls 110 on both sides respectively cover the first interdigital transducer 11 and the second interdigital transducer 12, that is, the orthographic projections of the first interdigital transducer 11 and the second interdigital transducer 12 onto the substrate 18 respectively fall into the orthographic projections of the retaining walls 110 on both sides onto the substrate. Wherein, under the pushing of the liquid-pushing device 13, the moving direction of the to-be-tested liquid is radiating and diffusing from the liquid-pushing device 13 to the surroundings, and when a large dose is required for the to-be-tested liquid and the substance in the to-be-tested liquid is not easily detected, the groove is arranged to guide the to-be-tested liquid, so that the to-be-tested liquid 19 reaches the reaction layer 14 between the first interdigital transducer 11 and the second interdigital transducer 12, and the reaction layer 14 is arranged between retaining walls 110 on both sides and is in contact with the to-be-tested liquid 19.

Wherein, regarding whether to arrange an insulation layer or not, there are two following ways for the design of the retaining wall 110.

As shown in FIG. 6, when the first interdigital transducer 11 and the second interdigital transducer 12 are covered by the insulation layer 17, the retaining walls 110 on both sides are respectively arranged at a side of the insulation layer 17 distal to the first interdigital transducer 11 and the second interdigital transducer 12, at this time, the reaction layer 14 may be arranged at a side of the insulation layer 17 distal to the substrate 18 and arranged between the retaining walls 110 on both sides.

As shown in FIG. 7, when the first interdigital transducer 11 and the second interdigital transducer 12 are arranged on the substrate 18, and the reaction layer 14 is arranged on the substrate 18, the retaining walls 110 on both sides are arranged on the substrate 18 and are in contact with the first interdigital transducer 11 and the second interdigital transducer 12, respectively. Wherein, the retaining walls 110 on both sides can completely cover the first interdigital transducer 11 and the second interdigital transducer 12, respectively, so that the first interdigital transducer 11 and the second interdigital transducer 12 are isolated from the to-be-tested liquid 19 respectively by the retaining walls 110 on both sides, and the reaction layer 14 is arranged on the substrate 18 and in direct contact with the substrate 18, and is arranged between retaining walls 110 on both sides.

Specifically, the material of the retaining wall 110 is an insulation material. For the to-be-tested liquid 19 being conductive, a retaining wall 110 of insulation material is provided to ensure that the detection process may be performed properly.

According to a detection device provided by an embodiment of the present disclosure, the to-be-tested liquid is pushed to reach the reaction layer between the first interdigital transducer and the second interdigital transducer by the liquid-pushing device, and the substance in the to-be-tested liquid is detected according to an output frequency of the surface wave sensor composed of the first interdigital transducer and the second interdigital transducer and the reaction layer arranged therebetween, wherein the liquid-pushing device can continuously push the to-be-tested liquid to flow and diffuse, so that the to-be-tested liquid is in full contact with the reaction layer, and thus a detection process is performed sufficiently on the to-be-detected substance in the to-be-tested liquid to improve the accuracy of the detection. In addition, the surface wave sensor is used for biochemical detection, which has the characteristics of high precision and high sensitivity. Wherein, data may be outputted in frequency form, which can realize real-time and efficient data output.

Wherein, the liquid-pushing device adopts a third interdigital transducer, and each of the first interdigital transducer, the second insertion transducer, and the third insertion transducer is of a structure of metal electrodes of a finger-crossing-like shape formed on the surface of the piezoelectric substrate, which can be made to be a chip-scale size, thus can be applied to the chip-scale size detection environment, which overcomes the problem that the detection device has a large size and the detection application environment is limited in the related art.

Figure 8:
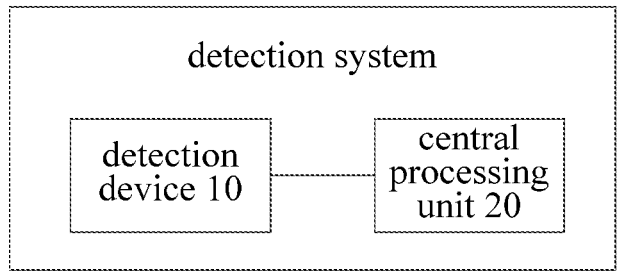
FIG. 8 is a block diagram of a detection system according to an embodiment of the present disclosure.

As shown in FIG. 8, the present disclosure provides in some embodiment a detection system including a central processing unit 20 and the above-described detection device 10; the detection device 10 is connected to the central processing unit 20, and the central processing unit 20 is configured to receive data signal detected by the detection device 10.

Figure 9:
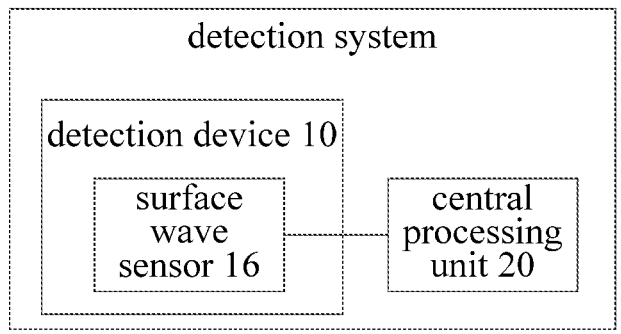
FIG. 9 is a block diagram of a detection system according to an embodiment of the present disclosure.

The structure and operation principle of the detection device 10 are the same as those of the foregoing embodiment, and details are not repeated herein. Referring to FIG. 9, in the detection device 10, the first interdigital transducer, the second interdigital transducer and the reaction layer constitute a surface wave sensor 16, and the central processing unit 20 receives and processes the frequency outputted by the surface wave sensor 16. When the frequency received by the central processing unit 20 changes, that is, when the frequency emitted by the first interdigital transducer is different from the frequency received by the second interdigital transducer, it indicates that the to-be-tested liquid contains the substance matching with the reaction layer, thereby determining the substance in the to-be-tested liquid according to the reaction layer. The central processing unit 20 may be a central processor or a computer. The devices and apparatuses in the related art that can implement the functions of the central processing unit 20 may be used, and details are not described herein.

Figure 10:
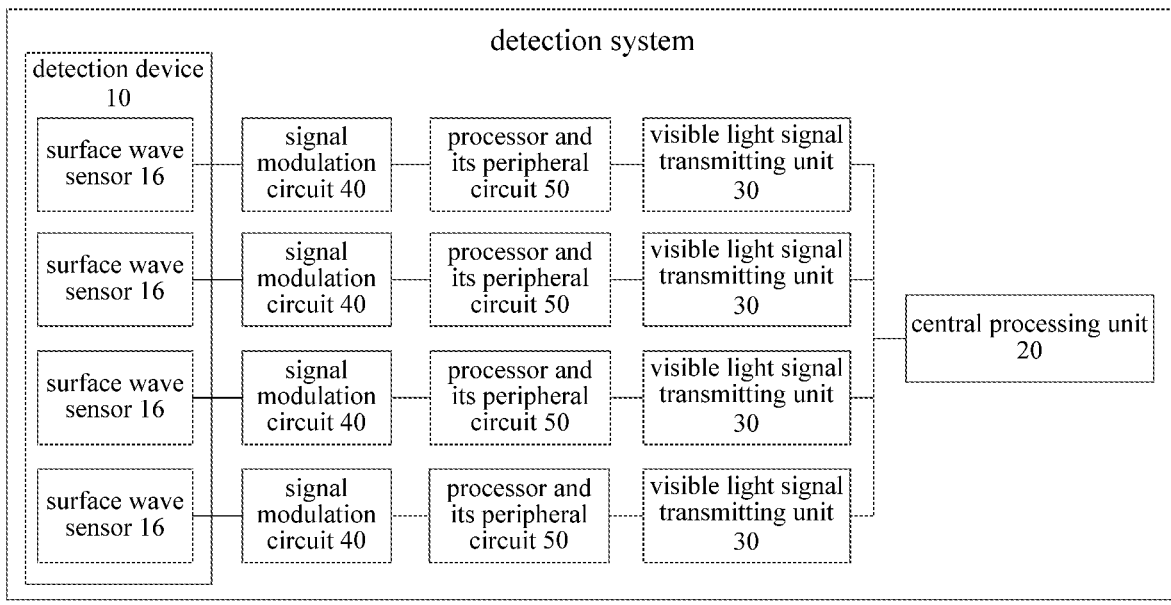
FIG. 10 is a block diagram of another detection system according to an embodiment of the present disclosure.

As shown in FIG. 10, when the quantity of surface wave sensors 16 of the detection device 10 is multiple, the frequency data outputted by each of the surface wave sensor 16 can be received by one central processing unit 20, and the frequency data outputted by each of the surface wave sensor 16 is separately processed, and a variety of substances in the to-be-tested liquid may be detected.

The central processing unit 20 can be respectively coupled to the surface wave sensor 16 and the liquid-pushing device of the detection device 10 to control the surface wave sensor 16 and the liquid-pushing device, respectively, and monitor the detection result in real time.

According to a detection device of a detection system provided by an embodiment of the present disclosure, the to-be-tested liquid is pushed to reach the reaction layer between the first interdigital transducer and the second interdigital transducer by the liquid-pushing device, and the substance in the to-be-tested liquid is detected according to an output frequency of the surface wave sensor composed of the first interdigital transducer and the second interdigital transducer and the reaction layer arranged therebetween, wherein the liquid-pushing device can continuously push the to-be-tested liquid to flow and diffuse, so that the to-be-tested liquid is in full contact with the reaction layer, and thus a detection process is performed sufficiently on the to-be-detected substance in the to-be-tested liquid to improve the accuracy of the detection. In addition, the surface wave sensor is used for biochemical detection, which has the characteristics of high precision and high sensitivity. Wherein, data may be outputted in frequency form, which can realize real-time and efficient data output.

Specifically, as shown in FIG. 10, data transmission is performed between the detection device 10 and the central processing unit 20 by visible light communication. A visible light signal transmitting unit 30 connected to the detection device 10 can be arranged. The visible light signal emitting unit 30 may use a lighting device (such as a fluorescent lamp or a light emitting diode) implanted in a networked device to transmit information by using a high-speed twinkling light signal that is invisible to the naked eye emitted by the lighting device such as a fluorescent lamp or a light-emitting diode, and the cable line for the high-speed Internet wire device is connected to the lighting device, such that the lighting device may operate properly upon being powered. Correspondingly, the central processing unit 20 includes a receiving circuit capable of receiving the visible light signal emitted by the visible light signal transmitting unit 30 to realize visible light communication. The detection data may be transmitted to the central processing unit 20 in real time through the visible light communication, the transmission speed is high, and the visible light communication is free of electromagnetic radiation, and thus it is not necessary to consider damage of electromagnetic radiation, and the visible light communication is more suitable for data transmission in a complex biochemical environment as compared to radio frequency communication in related art.

Specifically, a signal modulation circuit 40 is arranged between the detection device 10 and the central processing unit 20, and the signal modulation circuit 40 is configured to filter and shape the data signal detected by the detection device 10, so as to obtain the accurate date. In addition, the processor and its peripheral circuit 50 can be arranged according to the design in the related art, and details thereof are not described herein.

According to the detection device of the detection system provided by an embodiment of the present disclosure, the to-be-tested liquid is pushed to reach the reaction layer between the first interdigital transducer and the second interdigital transducer by the liquid-pushing device, and the substance in the to-be-tested liquid is detected according to an output frequency of the surface wave sensor composed of the first interdigital transducer and the second interdigital transducer and the reaction layer arranged therebetween, wherein the liquid-pushing device can continuously push the to-be-tested liquid to flow and diffuse, so that the to-be-tested liquid is in full contact with the reaction layer, and thus a detection process is performed sufficiently on the to-be-detected substance in the to-be-tested liquid to improve the accuracy of the detection. In addition, the surface wave sensor is used for biochemical detection, which has the characteristics of high precision and high sensitivity. Wherein, data may be outputted in frequency form, which can realize real-time and efficient data output. In addition, the detection data may be transmitted to the central processing unit in real time through the visible light communication, the transmission speed is high, and the visible light communication is free of electromagnetic radiation, and thus it is not necessary to consider damage of electromagnetic radiation, and the visible light communication is more suitable for data transmission in a complex biochemical environment as compared to radio frequency communication in related art.

An embodiment of the present disclosure further provides in some embodiments a detection method applied to the above detection device, including: transmitting, by the first interdigital transducer, a surface wave in the direction toward the second interdigital transducer, to enable the second interdigital transducer to receive the surface wave; enabling the reaction layer to be in contact with a to-be-tested liquid containing a to-be-detected substance; detecting, by the first interdigital transducer, a first frequency of the surface wave transmitted by the first interdigital transducer, and detecting, by the second interdigital transducer, a second frequency of the surface wave received by the second interdigital transducer; determining whether the first frequency is different from the second frequency; and in the case where the first frequency is different from the second frequency, determining that the to-be-detected substance contains a substance that matches the reaction layer.

Optionally, the detection device further includes a liquid-pushing device, the liquid-pushing device is arranged opposite to the reaction layer, a liquid-dropping region is arranged between the liquid-pushing device and the reaction layer, and the liquid-pushing device is configured to push liquid in a pushing direction toward the reaction layer. The step of enabling the reaction layer to be in contact with the to-be-tested liquid containing the to-be-detected substance includes: dropping the to-be-tested liquid containing the to-be-detected substance into the liquid-dropping region; and pushing, by the liquid-pushing device, the to-be-tested liquid to arrive at the reaction layer.

The above are merely preferred embodiments of the present disclosure, and are not intended to limit the present disclosure. Any simple modifications, equivalent changes and modifications made to the above embodiments in accordance with the principles of the present disclosure shall also fall within the scope of the present disclosure.

What is claimed is:

1. A detection device, comprising:
   a first interdigital transducer and a second interdigital transducer, wherein the first interdigital transducer is arranged opposite to the second interdigital transducer, and a surface wave of the first interdigital transducer is transmitted in a direction toward the second interdigital transducer;
   a reaction layer arranged between the first interdigital transducer and the second interdigital transducer;
   a liquid-pushing device, wherein the liquid-pushing device is arranged opposite to the reaction layer, a liquid-dropping region is arranged between the liquid-pushing device and the reaction layer, and the liquid-pushing device is configured to push liquid in a pushing direction toward the reaction layer;
   wherein two retaining walls are arranged respectively at two sides of the reaction layer, and the two retaining walls extend from respective two sides of the liquid-dropping region to respective two sides of the reaction layer to form a groove, and the two retaining walls covers respectively the first interdigital transducer and the second interdigital transducer;
   the first interdigital transducer and the second interdigital transducer are covered by an insulation layer, and the two retaining walls are arranged at a side of the insulation layer distal to the first interdigital transducer and the second interdigital transducer; and
   a surface of the insulation layer distal to the first interdigital transducer and the second interdigital transducer is in direct physical contact with the two retaining walls, each of the two retaining walls is a continuous structure made of an insulation material, respective two sides of the two retaining walls are opposite to each other and are in direct physical contact with the reaction layer, and each of the respective two sides of the two retaining walls is of a flat surface that forms an acute angle relative to the surface of the insulation layer.

2. The detection device according to claim 1, wherein the liquid-pushing device is a third interdigital transducer, and the pushing direction is a direction in which a surface wave of the third interdigital transducer is transmitted.

3. The detection device according to claim 2, wherein there are a plurality of first interdigital transducers and a plurality of the second interdigital transducers, and the quantity of the first interdigital transducers is equal to the quantity of the second interdigital transducers, one of the first interdigital transducers and one of the second interdigital transducers opposite to the one first interdigital transducer constitute a group of testing interdigital transducers, a respective reaction layer is arranged between the one first interdigital transducers and the one second interdigital transducer opposite to the one first interdigital transducer.

4. The detection device according to claim 3, wherein a plurality of groups of the testing interdigital transducers are arranged in at least one row, the groups of testing interdigital transducers arranged in the one row and one liquid-pushing device constitute a multi-unit joint detection structure;
in the multi-unit joint detection structure, a direction in which the surface wave of the liquid-pushing device is transmitted is same as a direction in which the groups of testing interdigital transducers are arranged in the one row.

5. The detection device according to claim 4, wherein in the multi-unit joint detection structure, a composition of the respective reaction layer arranged between the one of the first interdigital transducers and the one of the second interdigital transducers opposite to the one first interdigital transducer is different from a composition of another respective reaction layer arranged between another one of the first interdigital transducers and another one of the second interdigital transducers opposite to the other one first interdigital transducer.

6. The detection device according to claim 1, wherein the first interdigital transducer and the second interdigital transducer are arranged on a substrate, and the reaction layer is arranged on the substrate.

7. The detection device according to claim 1, wherein the reaction layer is arranged at a side of the insulation layer distal to the first interdigital transducer and the second interdigital transducer.

8. The detection device according to claim 1, wherein, the surface wave is a surface acoustic wave.

9. The detection device according to claim 1, wherein the liquid-dropping region is configured to accommodate to-be-tested liquid containing a to-be-detected substance, and the liquid-pushing device is further configured to be movable along the pushing direction, to push the to-be-tested liquid to arrive at the reaction layer, and enable the reaction layer to be in contact with the to-be-tested liquid.

10. The detection device according to claim 1, further comprising:
an output circuit configured to output a data signal, wherein the data signal indicates whether a first frequency of the surface wave detected by the first interdigital transducer is same as a second frequency of the surface wave detected by the second interdigital transducer.

11. A detection system comprising:
a central processing unit; and
the detection device according to claim 1,
wherein the detection device is connected to the central processing unit, and the central processing unit is configured to receive a data signal detected by the detection device.

12. The detection system according to claim 11, wherein data is transmitted between the detection device and the central processing unit through visible light communication.

13. The detection system according to claim 11, wherein a signal modulation circuit is arranged between the detection device and the central processing unit, and the signal modulation circuit is configured to filter and shape the data signal detected by the detection device.

14. A detection method for the detection device according to claim 1, comprising:
transmitting, by the first interdigital transducer, a surface wave in the direction towards the second interdigital transducer, to enable the second interdigital transducer to receive the surface wave;
enabling the reaction layer to be in contact with to-be-tested liquid containing a to-be-detected substance;
detecting, by the first interdigital transducer, a first frequency of the surface wave transmitted by the first interdigital transducer, and detecting, by the second interdigital transducer, a second frequency of the surface wave received by the second interdigital transducer;
determining whether the first frequency is different from the second frequency; and
in the case that the first frequency is different from the second frequency, determining that the to-be-detected substance contains a substance that matches with the reaction layer.

15. The detection method according to claim 14, wherein the detection device further comprises a liquid-pushing device, the liquid-pushing device is arranged opposite to the reaction layer, a liquid-dropping region is arranged between the liquid-pushing device and the reaction layer, and the liquid-pushing device is configured to push liquid in a pushing direction toward the reaction layer,
enabling the reaction layer to be in contact with the to-be-tested liquid containing the to-be-detected substance comprises:
dropping the to-be-tested liquid containing the to-be-detected substance into the liquid-dropping region; and
pushing, by the liquid-pushing device, the to-be-tested liquid to arrive at the reaction layer.

* * * * *